(12) United States Patent
Zoppas et al.

(10) Patent No.: US 11,542,140 B2
(45) Date of Patent: Jan. 3, 2023

(54) SYSTEM AND PROCESS FOR PRODUCING THERMOPLASTIC MATERIAL CONTAINERS

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Matteo Zoppas, Conegliano (IT); Enrico Gribaudo, Conegliano (IT); Renato Le Brun, Parma (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 264 days.

(21) Appl. No.: 16/954,359

(22) PCT Filed: Dec. 18, 2018

(86) PCT No.: PCT/IB2018/060232
§ 371 (c)(1),
(2) Date: Jun. 16, 2020

(87) PCT Pub. No.: WO2019/123235
PCT Pub. Date: Jun. 27, 2019

(65) Prior Publication Data
US 2021/0087040 A1    Mar. 25, 2021

(30) Foreign Application Priority Data
Dec. 18, 2017 (IT) .......................... 102017000145554

(51) Int. Cl.
*B29C 49/46*   (2006.01)
*B29C 49/64*   (2006.01)
(Continued)

(52) U.S. Cl.
CPC ............ *B67C 7/0073* (2013.01); *B29C 49/04* (2013.01); *B29C 49/28* (2013.01);
(Continued)

(58) Field of Classification Search
CPC .......... B29C 49/4273; B29C 49/42822; B29C 49/28; B29C 49/46; B29C 2049/4635;
(Continued)

(56) References Cited

U.S. PATENT DOCUMENTS

| 6,298,638 | B1 | 10/2001 | Bettle |
| 2016/0193776 | A1 | 7/2016 | Lewin et al. |
| 2016/0229108 | A1 | 8/2016 | Aoki |

FOREIGN PATENT DOCUMENTS

| CN | 102198872 A | 9/2011 |
| CN | 104080589 A | 10/2014 |

(Continued)

OTHER PUBLICATIONS

PCT/IB2018/060232—International Search Report and Written Opinion, dated Apr. 2, 2019, 13 pages.

*Primary Examiner* — Robert B Davis
(74) *Attorney, Agent, or Firm* — Amster Rothstein & Ebenstein LLP

(57) ABSTRACT

A system (1) for producing thermoplastic material bottles (5),
the system (1) comprising in sequence:
  an extruder (10);
  a molding apparatus (20) for producing preforms;
  a thermal conditioning apparatus (30) for thermally conditioning the preforms;

(Continued)

a blowing apparatus (40) for producing bottles (5) from the preforms;
a pulsed light irradiation apparatus (50, 55, 60, 70);
an aseptic filling and capping apparatus (80).

11 Claims, 3 Drawing Sheets

(51) Int. Cl.
*B67C 7/00* (2006.01)
*B29C 49/04* (2006.01)
*B29C 49/28* (2006.01)
*B29C 49/42* (2006.01)
*B29K 67/00* (2006.01)
*B29L 31/00* (2006.01)

(52) U.S. Cl.
CPC ........ *B29C 49/42822* (2022.05); *B29C 49/46* (2013.01); *B29C 49/6409* (2013.01); *B29C 49/4273* (2013.01); *B29C 2049/4635* (2013.01); *B29K 2067/003* (2013.01); *B29L 2031/7158* (2013.01)

(58) Field of Classification Search
CPC .. B29C 2049/4697; B67C 7/0073; A61L 2/08
See application file for complete search history.

(56) References Cited

FOREIGN PATENT DOCUMENTS

| | | | |
|---|---|---|---|
| CN | 205740330 U | * | 11/2016 |
| EP | 2143545 A1 | | 1/2010 |
| EP | 2292550 A1 | | 3/2011 |
| EP | 3187324 A1 | | 7/2017 |
| JP | 2005001383 A | | 1/2005 |
| JP | 2016141400 A | | 8/2016 |

* cited by examiner

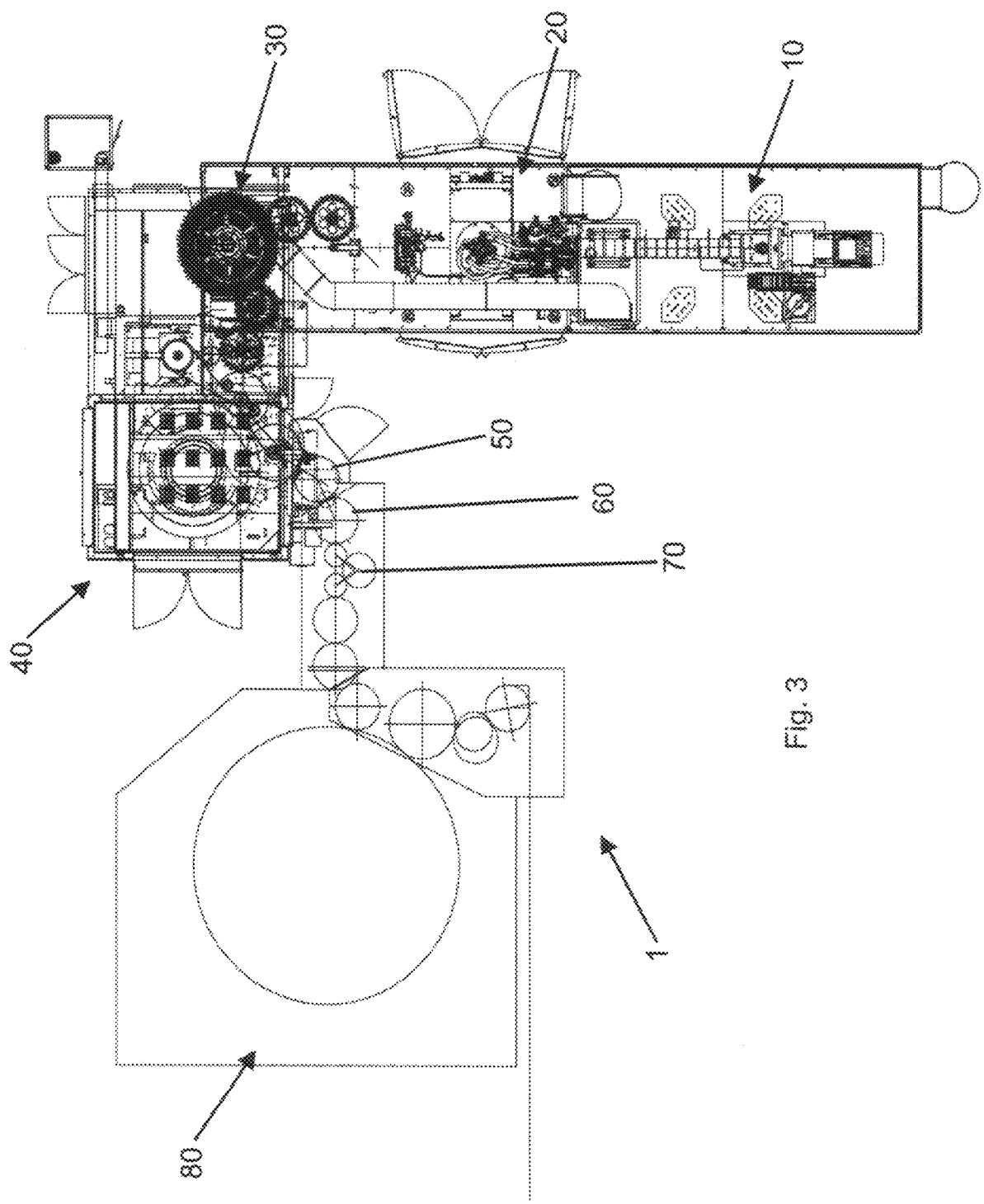

SYSTEM AND PROCESS FOR PRODUCING THERMOPLASTIC MATERIAL CONTAINERS

FIELD OF THE INVENTION

The present invention relates to a system for producing thermoplastic material containers, e.g. bottles, in particular for sensitive products packaged in an aseptic environment, and to a process for producing such containers.

BACKGROUND OF THE INVENTION

In the field of packaging, the sterility of the containers, e.g. bottles for sensitive products packaged in an aseptic environment, is a crucial aspect. Examples of such products are foods, pharmaceuticals and cosmetics.

The containers made of thermoplastic material, e.g. polyethylene terephthalate (PET), are typically sterilized by means of solutions of hydrogen peroxide ($H_2O_2$) or peroxyacetic acid (PAA).

Although they are commonly used, such sterilization methods have a series of disadvantages, including: presence of chemical compound residues, relatively lengthy processing times, difficulty in controlling the sterilization apparatus, and use of consumables, in particular $H_2O_2$ and PAA, with relatively high costs.

Moreover, certain systems include using particular systems which are used to keep the sterility of the system itself. However, such systems are expensive, difficult to be produced and require an expensive maintenance.

The need is therefore felt to improve the method of industrially sterilizing thermoplastic material containers for food use.

SUMMARY OF THE INVENTION

It is the object of the present invention to provide a system which allows optimizing the disinfection, sanitization or sterilization of thermoplastic material containers, e.g. bottles, for food, pharmaceutical or cosmetic products, for example PET bottles for containing sensitive products which require aseptic filling.

It is another object of the present invention to provide such a type of system which allows the disinfection, sanitization or sterilization operations to be carried out in a simpler and more efficient and affordable manner with respect to the prior art.

It is another object of the present invention to provide a process which may be carried out by means of the aforesaid system.

The present invention achieves at least one of such objects, and others which will become apparent from the present description, by providing a system for producing plastic containers comprising, in sequence:
  an extruder;
  a molding apparatus for producing preforms;
  a thermal conditioning apparatus for thermally conditioning the preforms;
  a blow molding apparatus for producing containers from the preforms;
  a pulsed light irradiation apparatus;
  an aseptic filling and capping apparatus for filling and capping the containers.

Advantageously, the extruder and the aforesaid apparatuses are part of the same system, thus defining a production line. In particular, the extruder and the aforesaid apparatuses are arranged in the same environment, for example the same warehouse or industrial building. In other words, the aforesaid system substantially is a system.

It is to be understood that means for transferring the containers—for example, one or more transport wheels—are not excluded from being provided between one or more apparatuses. Preferably, but not exclusively, only transfer means of the containers, i.e. of the preforms and/or bottles, are provided between one or more apparatuses.

The pulsed light irradiation apparatus is preferably arranged only between the blow molding apparatus and the aseptic filling and capping apparatus.

In particular, preferably, means for irradiating with light, e.g. pulsed light, are not provided for irradiating the preforms. In particular, preferably, such pulsed light irradiation means are not arranged upstream of the blow molding apparatus.

According to one aspect, the system advantageously is configured to carry out the sterilization by means of pulsed light of just blown bottles starting from preforms which are made in the same system by a series of apparatuses which performs, in sequence, preferably in immediate sequence, the steps of: extrusion, injection and compression, thermal conditioning and blowing. Following sterilization, the bottles are aseptic filled and capped. Each of said steps is typically carried out in a respective module or in other words, is carried out by means of a respective apparatus. Such apparatuses are part of the same system. Such apparatuses are preferably connected to one another, preferably directly connected to one another.

According to one aspect, the invention also provides a process for producing plastic containers, which can be carried out in a system as defined above, comprising the steps of:
  a) producing preforms by means of the molding apparatus;
  b) thermally conditioning the preforms by means of a thermal conditioning apparatus;
  c) producing containers from the preforms by means of a blow molding apparatus;
  d) irradiating the containers by means of a pulsed light irradiation apparatus;
  e) filling with a liquid and capping the containers by means of an aseptic filling and capping apparatus.

Advantageously, the irradiation with pulsed light allows the disinfection, sanitization or sterilization of the containers or of a part thereof. For this purpose, a broad-spectrum light is preferably used, which light is generated by the flashing of one or more lamps, preferably of the high-intensity discharge (HID) type, such as for example, one or more Xenon lamps.

The layout of the system allows the pulsed light irradiation to be efficiently and effectively used as means of disinfecting, sanitizing or sterilizing.

In particular, by providing the extruder, the molding apparatus, the thermal conditioning apparatus and the blowing apparatus arranged upstream of the pulsed light irradiation apparatus, the bottles which are subjected to pulsed light irradiation already have a low level of contamination. Indeed, the contamination level of the plastic is very low due to the temperature reached by the plastic in the extruder and in the molding apparatus, and there is no need for further sterilization means of the preforms and there is no need for barriers for avoiding the contamination of the preforms. Indeed, the contamination level of the preforms is adequately low, in particular due to the temperature reached in the extruder.

The necessary sterility level which is required for containers for food products, e.g. edible liquids, is achieved by means of the pulsed light irradiation of the containers.

Moreover, it is advantageous that the aseptic filling and capping apparatus is arranged downstream of the pulsed light irradiation apparatus, preferably immediately downstream of the irradiation apparatus. Thereby, the bottles do not lose the benefits obtained with the exposure to the pulsed light.

The pulsed light irradiation apparatus preferably comprises two transfer wheels placed side-by-side, which define a respective pitch circle. A first wheel transfers bottles to a second wheel. The path followed by the bottles comprises an inflection point. Such an inflection point is in the tangent point of the pitch circles of the two wheels. The stretch of path followed by the bottles close to the tangent at the two pitch circles, more specifically close to the inflection point, is approximable to a substantially linear stretch. In other words, the bottles are approximately aligned along a straight line, along a stretch of the path thereof. Such a straight line preferably forms an optimal angle with respect to the tangent line at the pitch diameters, optionally except for a few millimeters. Advantageously, a pulsed light irradiation device is provided arranged with the aforesaid optimal angle with respect to the tangent line. The pulsed light irradiation device has at least one lamp which preferably has a straight geometry. The pulsed light irradiation device is preferably arranged above the two transfer wheels so that the longitudinal axis of the lamp is arranged with an optimal angle with respect to the tangent line at the pitch circles of the two wheels, so as to best approximate, with a straight line, the path of the bottles along the pitch circles of the two wheels.

An advantage of such an arrangement can be appreciated in consideration of the fact that the irradiation device generates a light beam with a mainly linear component. Thus, the bottles which are close to the tangent line are exposed in optimal and substantially uniform manner to the pulsed light. The part of the bottles which is subjected to irradiation typically comprises at least the neck of the bottles, in particular the outer part of the neck.

The pulsed light irradiation device, in particular the at least one lamp thereof, preferably faces the neck of the bottles, preferably only the neck of the bottles.

A pulsed light irradiation machine, also called second irradiation device, is preferably provided downstream of the second wheel. Such a machine preferably comprises a plurality of pulsed light lamps which are configured, in particular sized, to be inserted into the bottles so as to irradiate the inner part thereof. Such a machine preferably comprises a sterile upper chamber where the necks of the bottles are arranged, and a non-sterile lower chamber where the portions of bottles below the neck ring are arranged. The separation between the sterile chamber and the clean chamber allows the necks of the bottles to be isolated, so that an aseptic packaging can be achieved by only sterilizing the neck and the inner surface of the containers.

The dependent claims describe particular embodiments of the invention.

BRIEF DESCRIPTION OF THE DRAWINGS

Further features and advantages of the invention will be more apparent in light of the detailed description of particular, but not exclusive, embodiments of a system for producing thermoplastic material containers. An exemplary process which may be carried out by means of such a type of system is also described.

The description is provided by way of a non-limiting example, referring to the accompanying drawings, also given by way of a non-limiting example, in which:

FIG. 3 shows a diagrammatic plan view of an embodiment of a system according to the invention.

The same reference numerals in the drawings identify the same elements or components.

DETAILED DESCRIPTION OF EMBODIMENTS OF THE INVENTION

Figure 1:
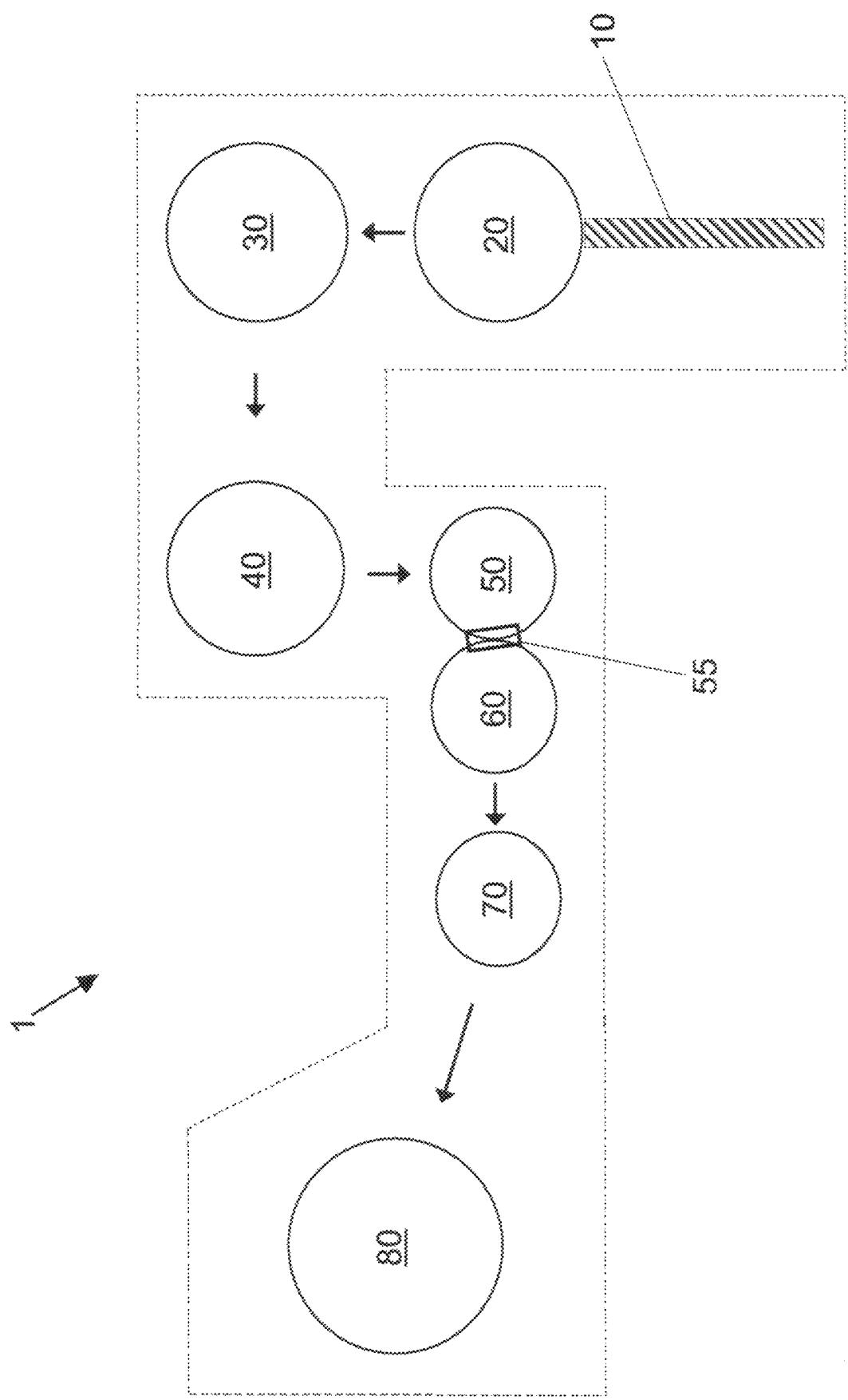
FIG. 1 shows a diagrammatic plan view of a layout of a system according to the invention.

With reference to the figures, a system 1 for producing containers made of thermoplastic material, e.g. PET, is shown. The system 1 comprises, in sequence:

an extruder 10;
a molding apparatus 20 for producing preforms;
a thermal conditioning apparatus 30 for thermally conditioning the preforms;
a blowing apparatus 40 for producing bottles 5 from the preforms;
a pulsed light irradiation apparatus 50, 55, 60, 70 for irradiating the bottles 5;
an aseptic filling and capping apparatus 80.

In particular, the extruder 10 and the aforesaid apparatuses are arranged in sequence one after another, thus defining a production line.

The extruder 10 may be of the type known per se, and therefore it not further described.

The molding apparatus 20 may be of the injection, compression or injection-compression type. The molding apparatus 20 preferably is of the rotary type.

The molding apparatus 20 preferably is of the injection-compression rotary type. The plastic in the molding apparatus 20 preferably is at a temperature between 250° C. and 300° C., for example about 280° C. The preforms of the bottles are made by means of the molding apparatus 20.

The thermal conditioning apparatus 30 is arranged downstream of the molding apparatus 20 and is used to thermally condition the preforms. The preforms are preferably heated by means of the thermal conditioning apparatus 30, by means of heating means, preferably to a temperature between 90° C. and 150° C., for example about 130° C. The thermal conditioning apparatus 30 preferably is of the rotary type.

One or more transfer means, for example one or more transfer wheels, for transferring the preforms from the molding apparatus 20 to the thermal conditioning apparatus 30 is preferably provided between the molding apparatus 20 and the thermal conditioning apparatus 30.

The blowing apparatus 40 is arranged downstream of the thermal conditioning apparatus 30 and is used to produce bottles from the preforms. The preforms are typically subjected to a stretching-blowing process.

The contamination level of the preforms entering the blowing apparatus 40 typically, but not exclusively, is less than 1 ppm of non-sterile preforms.

One or more transfer means, for example one or more transfer wheels, for transferring the preforms from the thermal conditioning apparatus 30 to the blowing apparatus 40 is preferably provided between the thermal conditioning apparatus 30 and the blowing apparatus 40.

The contamination level of the preforms leaving the blowing apparatus 40 typically, but not exclusively, is between 100 ppm and 10,000 ppm of non-sterile bottles, for example about 1000 ppm of non-sterile bottles.

The pulsed light irradiation apparatus 50, 55, 60, 70 is arranged downstream of the blowing apparatus 40. The pulsed light irradiation apparatus 50, 55, 60, 70 is preferably arranged directly downstream of the blowing apparatus 40, there being no intermediate processing apparatuses provided, and there optionally being provided only transfer means between the blowing apparatus and the pulsed light irradiation apparatus.

Figure 2:
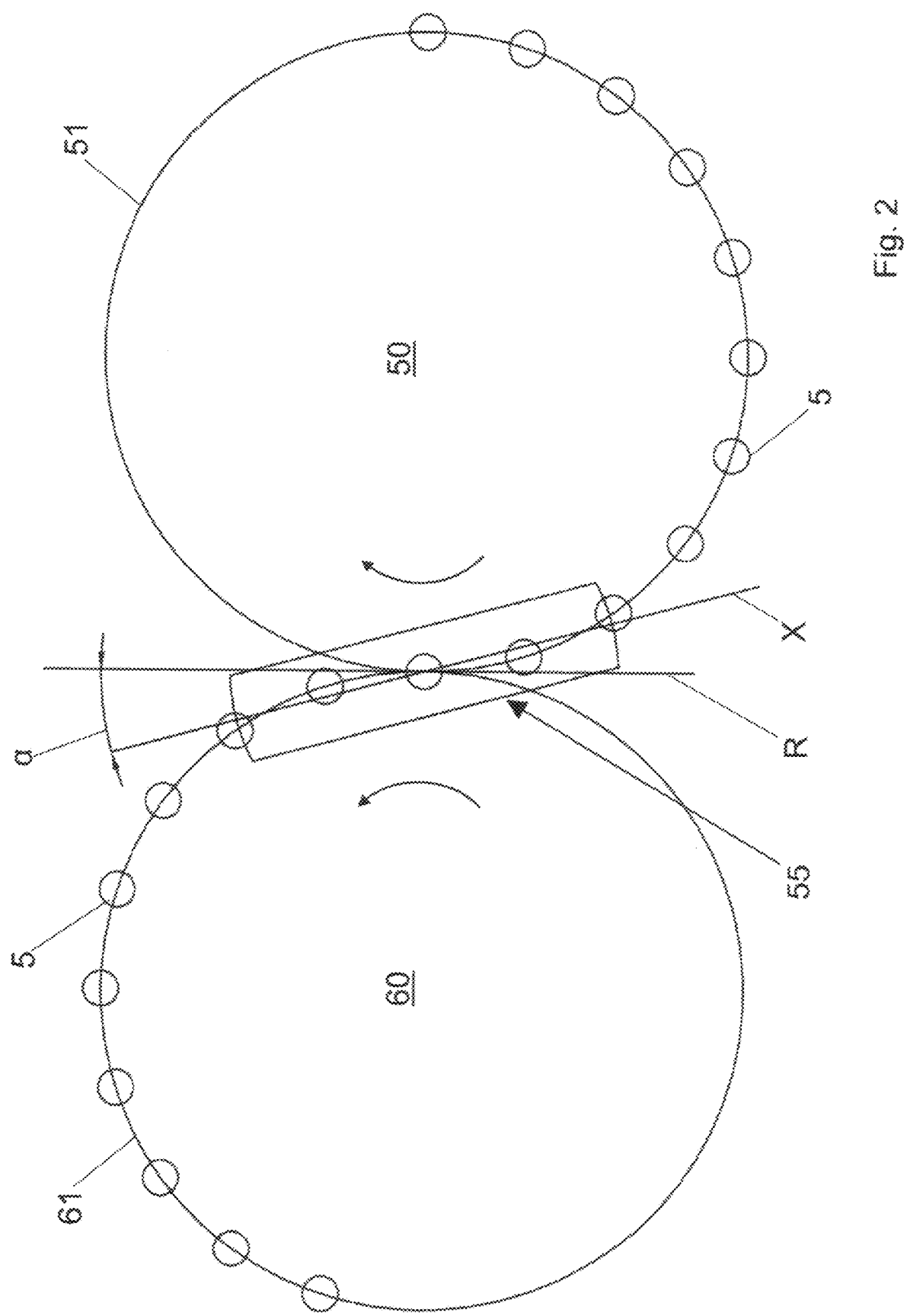
FIG. 2 shows a diagrammatic view of a detail of FIG. 1.

The pulsed light irradiation apparatus 50, 55, 60, 70 is used to disinfect, sanitize or sterilize the bottles 5 (diagrammatically shown in FIG. 2).

The pulsed light irradiation apparatus preferably comprises two wheels 50, 60, or stars, arranged in sequence, adapted to transport the bottles 5 (FIG. 2).

The wheels 50, 60 are arranged so that a first wheel 50 which is proximal to the blowing apparatus 40 is adapted to transfer the bottles 5 to a second wheel 60 which is distal from the blowing apparatus. The first wheel 50 and the second wheel 60 define a respective pitch circle 51, 61. The pitch circles 51, 61 preferably have a diameter, in particular a pitch diameter, of the same length. The pitch circle 51 of the first wheel 50 and the pitch circle 61 of the second wheel 60 are tangent in the point in which the containers pass from the first wheel 50 to the second wheel 60. The ideal straight line R is the tangent to the pitch circles 51, 61, i.e. to the pitch diameters of such circles. In particular, the straight line R passes through the tangent point between the pitch circles 51, 61.

The first wheel 50 and the second wheel 60 are configured to rotate in a mutual opposite direction, in particular according to the law of reciprocal rolling between the pitch diameters of the motion of the two wheels. For example, the first wheel 50 is configured to rotate in clockwise direction and the second wheel 60 is configured to rotate in anticlockwise direction. The wheels 50, 60 are provided, at the periphery thereof, with a plurality of retaining means for retaining respective bottles 5. Thus, the bottles 5 can rotate together with a respective wheel. The bottles 5 are preferably arranged so that the neck thereof is above the upper surface of the respective wheel.

The path followed by the bottles 5 comprises an inflection point, which corresponds to the tangent point between the pitch circles 51, 61. A stretch of path followed by the bottles 5 which are close to the inflection point is approximable to a substantially linear stretch. A given number of bottles 5 transported by the first wheel 50 and a given number of bottles 5 transported by the second wheel 60 are approximately aligned on a straight line with an optimal angle with respect to the straight line R, except for a few millimeters. Such a stretch of path, which comprises the inflection point, is defined by a portion of the first wheel 50 and by a portion the second wheel 60.

A pulsed light irradiation device 55, also called first irradiation device, is provided above the two wheels 50, 60, in particular above a transfer zone between the two wheels. The pulsed light irradiation device 55 comprises at least one lamp. The pulsed light irradiation device 55, in particular the at least one lamp, has a straight geometry, i.e. it defines a straight longitudinal axis. The pulsed light irradiation device 55 is arranged above the two wheels 50, 60 so that the neck of the bottles 5 is irradiated in optimal manner.

By mere way of example, a pulsed light irradiation device 55 which comprises one or more tubular lamps, preferably Xenon lamps, which are preferably configured to emit a 20 kV electric impulse, preferably with a duration of 0.3 ms, may be used. The pulsed light irradiation device 55 typically comprises at least one lamp of the high-intensity discharge type (HID), preferably one or more Xenon lamps, and one or more reflecting surfaces, or reflectors. Preferably there are two lamps. The lamps preferably are cylindrical, with a greater dimension, preferably much greater than the other two, so as to define a respective longitudinal axis. The longitudinal axes of the lamps are parallel to each other.

The pulsed light irradiation device 55 is preferably arranged so as to be at, preferably above, part of the periphery of the first wheel 50 and part of the periphery of the second wheel 60.

The pulsed light irradiation device 55 is preferably arranged so that the longitudinal axis X (FIG. 2) of the lamp, or of the lamps, has an optimal angle with respect to the aforesaid straight line R so as to deviate as little as possible from the path of the bottles. The longitudinal axis X substantially is coincident with or parallel to the longitudinal axis of the pulsed light irradiation device 55.

Preferably, the longitudinal axis X forms an angle α (alpha) with the straight line R which is equal to half the angle at the center of the polygon inscribed in the pitch circle 51 or 61, having the side equal to half the length of the lamp, along the longitudinal axis X.

The following is obtained from the formulas of the polygons:

$$\alpha = \arcsin(\text{lamp length}/(4\times \text{wheel radius})),$$

where "wheel radius" is the radius of the pitch circle 51 or 61, which have the pitch radius of the same length.

This formula is also valid if the lamp has a length which is not compatible with a regular polygon.

The length of the lamp may optionally be extended, with respect to the theoretical length of the calculation disclosed above, until the deviation of the longitudinal axis thereof from the trajectory of the bottles is less than the maximum deviation which occurs with bottle rotated (rotation about the axis of the wheel transporting it) by an angle α with respect to the tangent point: such a deviation is equal to the difference between apothem and radius of the aforesaid inscribed polygon.

Angle α preferably is between 0 and 15°, namely $0<\alpha<15$, or a $0\leq\alpha\leq15°$, for example it is equal to or about equal to 8°.

In light of the present description, those skilled in the art can understand how to arrange the pulsed light irradiation device 55 according to the rotation direction of the two wheels 50, 60.

For example, when the wheel 50 is configured to rotate in clockwise direction and the wheel 60 is configured to rotate in anticlockwise direction, the angular coefficient of the longitudinal axis X preferably is negative. Vice versa, when wheel 50 is configured to rotate in anticlockwise direction and wheel 60 is configured to rotate in clockwise direction, the angular coefficient of the longitudinal axis X preferably is positive.

By mere way of non-limiting example, the length of the lamp is equal to about 254 mm.

The lamps are facing the wheels 50, 60, and in particular towards the bottles 5, preferably towards the necks of the bottles. The pulsed light irradiation device 55 is preferably configured so that the lamps emit a light having a wavelength between 200 and 1100 nm at a flashing frequency between 1 and 20 Hz.

Preferably, the pulsed light irradiation device 55 also comprises a support structure in which the lamps are accommodated, and is provided with reflectors.

The pulsed light irradiation device 55 is preferably arranged so that the distance between the lamps and the bottles 5 to be irradiated is less than 50 mm.

In general, the two wheels 50, 60 and the pulsed light irradiation device 55 preferably define, or in any case form, part of a sterilization station, in particular for sterilizing the neck of the bottles 5.

The pulsed light irradiation apparatus 50, 55, 60, 70 preferably, but not exclusively, also comprises a pulsed light irradiation machine 70, also called second irradiation device, arranged downstream of the second wheel 60. The pulsed light irradiation machine 70 is configured to irradiate the inner surface of the bottles 5. One or more transfer means, for example one or more transfer wheels, is preferably provided between the second wheel 60 and the pulsed light irradiation machine 70 to transfer the bottles from the second wheel 60 to the pulsed light irradiation machine 70. The pulsed light irradiation machine 70 preferably is of the rotary type.

The pulsed light irradiation machine 70 is preferably provided with a plurality of lamps adapted to emit pulsed light, e.g. Xenon lamps. Each lamp is configured to be inserted into a respective bottle. For example, each lamp has a tubular shape. A disinfection, sanitization or sterilization of the inner walls of the bottles 5 is obtained by means of the pulsed light irradiation machine 70.

The pulsed light irradiation machine 70 preferably comprises two chambers, of which an upper chamber and a lower chamber. The lower chamber and the upper chamber are separated from each other by a baffle provided with openings. The upper chamber preferably is a sterile chamber, which is kept at an overpressure between 5 and 40 Pa, for example equal to about 20 Pa with respect to the surrounding environment. The lower chamber preferably is a non-sterile chamber, in which an overpressure between 0 and 30 Pa is generated, for example equal to about 10 Pa. Such overpressures are generated for example, by means of pressurization modules with sterile air generated by means of the use of filters, e.g. HEPA filters.

The pressure difference between the two sides of the baffle, namely between the two chambers, creates a flow of sterile air from the upper chamber to the lower chamber, passing through the aforesaid openings. Such a sterile airflow generates a dynamic barrier to protect the upper chamber from possible contamination coming from the chamber with lower pressure, namely the lower chamber.

The pulsed light irradiation machine 70 is configured so that the bottles 5 are arranged with the neck in the upper chamber and with the rest of the body in the lower chamber. The support systems of the bottles have such a geometry and position as to be an integral part of the separating baffle between upper chamber and lower chamber, both when the machine is stopped and when the machinery is in rotation for transporting the bottles.

One of the advantages of machine 70 is that the pulsed light may be used to sterilize the portion of lamp which is transferred from a non-sterile zone, above the cover of machine 70, to the sterile chamber below, thus keeping the sterility thereof.

Advantageously, the bottles 5 downstream of the pulsed light irradiation apparatus 50, 55, 60, 70 have a contamination level of less than 1 ppm of contaminated bottles.

The aseptic filling and capping apparatus 80, which is known per se, is arranged downstream of the pulsed light irradiation apparatus 50, 55, 60, 70. In particular, when the pulsed light irradiation machine 70 is provided, the aseptic filling and capping apparatus 80 is arranged downstream of such a machine 70. The bottles in the aseptic filling and capping apparatus 80 are filled with a preferably sterile product.

One or more transfer means, for example one or more transfer wheels, is preferably provided between the pulsed light irradiation machine 70 and the aseptic filling and capping apparatus 80 to transfer the bottles from the pulsed light irradiation machine 70 to the aseptic filling and capping apparatus 80.

The system 1 described above is an example of system suitable for carrying out the process of the invention, including its variants, which process is described below.

In general, the invention provides a process comprising the steps of:
 a) producing preforms by means of the extruder 10 and the molding apparatus 20;
 b) thermally conditioning the preforms by means of the thermal conditioning apparatus 30;
 c) producing bottles 5 from the preforms by means of the blowing apparatus 40;
 d) irradiating the bottles 5 by means of the pulsed light irradiation apparatus 50, 55, 60, 70;
 e) filling with a liquid or fluid and capping the bottles 5 by means of the aseptic filling and capping apparatus 80.

Preferably, step d) comprises:
 a step d1) wherein the at least one neck of the bottles 5 is irradiated by means of the pulsed light irradiation device 55; and optionally
 a step d2), successive to step d1), wherein the interior of each bottle 5 is irradiated by means of a respective lamp adapted to emit pulsed light and configured to be inserted into a respective bottle 5.

In step d1), at least the neck of the bottles 5 is preferably irradiated by at least one flash lasting between 0.1 and 3 ms, for example about 0.3 ms; and in step d2), the interior of each bottle 5 is irradiated by at least one flash lasting between 0.1 and 3 ms, for example about 0.3 ms; In step b), the preforms are preferably brought to a temperature between 100 and 150° C., e.g. 130° C.

The invention claimed is:

1. A system for producing containers made of plastic comprising, in sequence:
 an extruder;
 a molding apparatus for producing preforms;
 a thermal conditioning apparatus for thermally conditioning the preforms;
 a blow molding apparatus for producing the containers from the preforms;
 an aseptic filling and capping apparatus for filling and capping the containers;
wherein the system comprises a pulsed light irradiation apparatus;
 wherein the extruder, the molding apparatus, the thermal conditioning apparatus, the blow molding apparatus, the pulsed light irradiation apparatus and the aseptic filling and capping apparatus are arranged in sequence one after another, thus defining a production line;
 wherein the pulsed light irradiation apparatus comprises at least two wheels adapted to transport the containers, arranged in sequence, so that a first wheel of said at least two wheels is adapted to transfer the containers to a second wheel of said at least two wheels; and
 at least one first pulsed light irradiation device arranged above the first wheel and the second wheel; and
 wherein the at least one first pulsed light irradiation device comprises at least one lamp defining a longitudinal axis, wherein the pitch circle of the first wheel and the pitch circle of the second wheel are tangent in a tangent point, whereby there is defined a tangent straight line, tangent to the pitch circle of the first wheel and to the pitch circle of the second wheel, and wherein the longitudinal axis forms an angle ($\alpha$) with said tangent straight line between 0° and 15°.

2. The system according to claim 1, wherein the first wheel and the second wheel are configured to rotate in a mutual opposite direction, whereby the containers follow a path during the rotation of the first wheel and of the second wheel which comprises an inflection point coinciding with the tangent point between the pitch circle of the first wheel and the pitch circle of the second wheel.

3. The system according to claim 1, wherein said pulsed light irradiation apparatus comprises a second pulsed light irradiation device arranged downstream of the second wheel and provided with a plurality of lamps adapted to emit pulsed light, of which each lamp is configured to be inserted into a respective containers.

4. The system according to claim 3, wherein the second pulsed light irradiation device comprises an upper chamber adapted to receive the neck of each container, and a lower chamber adapted to receive the part of each container which is below a support ring of the container.

5. A process for producing plastic containers carried out in the system according to claim 1, comprising the steps of:
   a) producing preforms by means of the extruder and of the molding apparatus;
   b) thermally conditioning the preforms by means of a thermal conditioning apparatus;
   c) producing containers from the preforms by means of a blow molding apparatus;
   d) irradiating the containers by means of a pulsed light irradiation apparatus;
   e) filling with a liquid and capping the containers by means of the aseptic filling and capping apparatus.

6. The process according to claim 5, wherein said step d) comprises:
   a step d1) of irradiating the least the neck of the containers by at least one first pulsed light irradiation device of the pulsed light irradiation apparatus.

7. The process according to claim 6, wherein in step d1), at least the neck of the containers is irradiated by at least one flash lasting between 0.1 and 1 millisecond (ms).

8. The process according to claim 6, wherein after step d1), the process further comprises step d2) of irradiating the interior of each container by a respective lamp which emits pulsed light into a respective container.

9. The process according to claim 8, wherein the interior of each container is irradiated by at least one flash lasting between 0.1 and 1 ms.

10. The system according to claim 1, wherein said pulsed light irradiation apparatus comprises a second pulsed light irradiation device arranged downstream of the second wheel and provided with a plurality of lamps adapted to emit pulsed light, of which each lamp is configured to be inserted into a respective container.

11. The system according to claim 2, wherein said pulsed light irradiation apparatus comprises a second pulsed light irradiation device arranged downstream of the second wheel and provided with a plurality of lamps adapted to emit pulsed light, of which each lamp is configured to be inserted into a respective container.

* * * * *